(12) United States Patent
Koch

(10) Patent No.: US 12,734,885 B2
(45) Date of Patent: Sep. 15, 2026

(54) SUBASSEMBLY FOR A MEANS OF TRANSPORT, AND MEANS OF TRANSPORT

(71) Applicant: Continental Automotive Technologies GmbH, Hannover (DE)

(72) Inventor: Marcus Koch, Waldbronn (DE)

(73) Assignee: Continental Automotive Technologies GmbH, Hannover (DE)

( * ) Notice: Subject to any disclaimer, the term of this patent is extended or adjusted under 35 U.S.C. 154(b) by 418 days.

(21) Appl. No.: 18/199,484

(22) Filed: May 19, 2023

(65) Prior Publication Data

US 2023/0373310 A1 Nov. 23, 2023

(30) Foreign Application Priority Data

May 20, 2022 (DE) ..................... 10 2022 205 053.3

(51) Int. Cl.

*B60K 35/50* (2024.01)
*B60K 35/22* (2024.01)
*B60K 35/60* (2024.01)
*B60K 37/00* (2024.01)

(52) U.S. Cl.

CPC .............. *B60K 35/50* (2024.01); *B60K 35/22* (2024.01); *B60K 35/60* (2024.01); *B60K 37/00* (2013.01)

(58) Field of Classification Search

CPC ........ B60K 35/50; B60K 35/60; B60K 35/22; B60K 35/00; B60K 37/10; B60K 37/00; B60K 37/20; B60K 2360/774; B60K 2360/828; B60K 2360/84; B60K 2360/834; B60K 2360/60; B60K 2360/816; B60K 2360/822; B62D 25/14; B62D 25/00

USPC ........................................................... 296/70

See application file for complete search history.

(56) References Cited

U.S. PATENT DOCUMENTS

| | | | |
|---|---|---|---|
| 4,112,718 | A | 9/1978 | Logsdon et al. |
| 4,256,340 | A | 3/1981 | Dunchock |
| 4,818,008 | A | 4/1989 | Cressoni |
| 5,443,285 | A | 8/1995 | Boll |
| 5,905,477 | A | 5/1999 | Kuwayama et al. |
| 6,149,196 | A | 11/2000 | Guiard et al. |
| 6,175,170 | B1 | 1/2001 | Kota et al. |
| 7,692,127 | B1 | 4/2010 | Linn et al. |
| 8,727,413 | B2 | 5/2014 | Seiller et al. |
| 9,233,649 | B2 | 1/2016 | Ceccato et al. |

(Continued)

FOREIGN PATENT DOCUMENTS

| | | |
|---|---|---|
| CN | 103742840 A | 4/2014 |
| CN | 104797973 | 7/2015 |

(Continued)

OTHER PUBLICATIONS

Notice to Submit Response of Korean Patent Application No. 10-2023-0051655, dated Jun. 17, 2025.

(Continued)

*Primary Examiner* — Amy R Weisberg
*Assistant Examiner* — Philip C Adams
(74) *Attorney, Agent, or Firm* — COZEN O'CONNOR

(57) ABSTRACT

A subassembly for a transport and a transport comprising a subassembly is disclosed. The subassembly has a carrier element with fastening elements for fastening the subassembly in the transport. The fastening elements are an integral part of the carrier element. At least individual fastening elements are configured as energy-absorbing.

11 Claims, 6 Drawing Sheets

(56) References Cited

U.S. PATENT DOCUMENTS

| | | | |
|---|---|---|---|
| 9,573,529 | B2 | 2/2017 | Hipshier et al. |
| 9,834,254 | B2 | 12/2017 | Staines |
| 9,878,674 | B2 | 1/2018 | Dunham et al. |
| 9,979,923 | B1 | 5/2018 | Nemeth et al. |
| 10,065,572 | B2 | 9/2018 | Kuntze et al. |
| 10,537,033 | B2 | 1/2020 | Delmaere et al. |
| 10,556,556 | B2 | 2/2020 | Alexander et al. |
| 10,675,975 | B2 | 6/2020 | Krier et al. |
| 10,836,326 | B1 | 11/2020 | Yang |
| 11,363,745 | B1 | 6/2022 | Duncan et al. |
| 2001/0048265 | A1 | 12/2001 | Miller et al. |
| 2005/0138852 | A1 | 6/2005 | Yamauchi |
| 2006/0203480 | A1 | 9/2006 | Choi |
| 2008/0030648 | A1 | 2/2008 | Morita et al. |
| 2008/0043463 | A1 | 2/2008 | Park et al. |
| 2008/0068860 | A1 | 3/2008 | Peng et al. |
| 2010/0001150 | A1 | 1/2010 | Chiu |
| 2010/0090498 | A1 | 4/2010 | Jungert et al. |
| 2010/0141867 | A1 | 6/2010 | Ogihara et al. |
| 2011/0141702 | A1 | 6/2011 | Kiesel et al. |
| 2011/0216527 | A1 | 9/2011 | Fan et al. |
| 2011/0304798 | A1 | 12/2011 | Tanaka et al. |
| 2012/0063081 | A1 | 3/2012 | Grunwald |
| 2013/0128128 | A1 | 5/2013 | Ikuta |
| 2013/0195711 | A1 | 8/2013 | Araoka et al. |
| 2014/0301025 | A1 | 10/2014 | Liu |
| 2014/0306576 | A1 | 10/2014 | Ervin et al. |
| 2016/0009178 | A1 | 1/2016 | Busse et al. |
| 2016/0046243 | A1 | 2/2016 | Rode et al. |
| 2016/0345045 | A1 | 11/2016 | Liu et al. |
| 2016/0362072 | A1 | 12/2016 | Xu et al. |
| 2017/0212555 | A1 | 7/2017 | Fafard |
| 2017/0249011 | A1 | 8/2017 | Belley et al. |
| 2018/0293964 | A1 | 10/2018 | Kuehn et al. |
| 2019/0265551 | A1 | 8/2019 | Liu et al. |
| 2020/0062191 | A1 | 2/2020 | Hayes et al. |
| 2020/0166803 | A1 | 5/2020 | Kyoukane et al. |
| 2020/0287109 | A1 | 9/2020 | Chang et al. |
| 2020/0292885 | A1 | 9/2020 | Liu et al. |
| 2020/0326592 | A1 | 10/2020 | Lin et al. |
| 2020/0384861 | A1 | 12/2020 | Kadam et al. |
| 2021/0162931 | A1 | 6/2021 | Bruegl et al. |
| 2021/0317943 | A1 | 10/2021 | Kang et al. |
| 2022/0136539 | A1 | 5/2022 | Longo et al. |
| 2022/0227307 | A1 | 7/2022 | Shout et al. |
| 2022/0299823 | A1 | 9/2022 | Li et al. |
| 2023/0166597 | A1 | 6/2023 | Guenther et al. |
| 2023/0202300 | A1 | 6/2023 | Badar et al. |
| 2024/0262199 | A1 | 8/2024 | Hokari et al. |

FOREIGN PATENT DOCUMENTS

| | | | | |
|---|---|---|---|---|
| CN | 204494220 | | 7/2015 | |
| CN | 107031402 | | 8/2017 | |
| CN | 209086612 | | 7/2019 | |
| CN | 210437017 | | 5/2020 | |
| CN | 112445026 | | 3/2021 | |
| CN | 112764267 | | 5/2021 | |
| CN | 215219371 | | 12/2021 | |
| CN | 215340620 | | 12/2021 | |
| CN | 114174905 | | 3/2022 | |
| CN | 216128148 | | 3/2022 | |
| DE | 4217177 | C2 | 5/1994 | |
| DE | 102014001862 | B4 | 10/2015 | |
| DE | 102014221505 | A1 | 4/2016 | |
| DE | 102016004156 | A1 | 9/2016 | |
| DE | 102015010295 | A1 | 2/2017 | |
| DE | 102016200902 | A1 | 7/2017 | |
| DE | 202018002037 | U1 * | 5/2018 | ............ B60K 35/81 |
| DE | 102018110548 | A1 | 11/2019 | |
| DE | 102018218328 | B3 | 3/2020 | |
| DE | 102020128465 | B3 | 3/2022 | |
| DE | 102021103740 | A1 | 8/2022 | |
| EP | 1687185 | B1 | 4/2008 | |
| EP | 2156261 | A1 | 2/2010 | |
| EP | 3045340 | A1 | 7/2016 | |
| JP | S60219121 | | 11/1985 | |
| JP | S6118517 | A | 1/1986 | |
| JP | S61018517 | | 1/1986 | |
| JP | 2006282100 | | 10/2006 | |
| JP | 2010135204 | A | 6/2010 | |
| JP | 2017037832 | A | 2/2017 | |
| JP | 2020053405 | A | 4/2020 | |
| KR | 101519349 | | 5/2015 | |
| KR | 20150065318 | | 6/2015 | |
| KR | 20170061535 | A | 6/2017 | |
| KR | 20180062573 | A | 6/2018 | |
| TW | 200842448 | A | 11/2008 | |
| TW | 200931120 | A | 7/2009 | |
| TW | 202109160 | A | 3/2021 | |
| TW | 202142936 | A | 11/2021 | |
| WO | 2008127731 | A1 | 10/2008 | |
| WO | 2017097583 | A1 | 6/2017 | |
| WO | 2020008237 | A1 | 1/2020 | |
| WO | 2021242558 | A2 | 12/2021 | |

OTHER PUBLICATIONS

Notice of Decision of Rejection of Korean Patent Application No. 10-2023-0051656, dated Jun. 17, 2025.
Office Action dated Dec. 13, 2022 from related German patent application No. 10 2022 205 050.9.
Search Report dated Nov. 14, 2023 from related European patent application No. 23165862.6.
Non-FInal Office Action mailed Feb. 12, 2025 from related U.S. Appl. No. 18/199,465.
Office Action issued on Oct. 22, 2024 from related Korean patent application No. 10-2023-0051654.
Office Action issued on Oct. 18, 2024 from related Korean patent application No. 10-2023-0063424.
Office Action dated Dec. 20, 2022 from related German patent application No. 10 2022 205 051.7.
Search Report dated Nov. 16, 2023 from related European patent application No. 23165875.8.
Search Report dated Nov. 14, 2023 from related European patent application No. 23165869.1.
Office Action dated Dec. 16, 2022 from related German patent application No. 10 2022 205 052.5.
Office Action dated Dec. 14, 2022 from related German patent application No. 10 2022 205 083.5.
Search Report dated Oct. 20, 2023 from related European patent application No. 23170127.7.
Non-Final Office Action dated Sep. 6, 2023 from related U.S. Appl. No. 18/199,477.
Office Action dated Jan. 18, 2023 from corresponding German patent application No. 10 2022 205 053.3.
Office Action received Aug. 2, 2024 from related Taiwan patent application No. 112118715.
Office Action of related U.S. Appl. No. 18/199,454, dated Aug. 21, 2025.
Office Action of related U.S. Appl. No. 18/199,465 dated Sep. 10, 2025.
Office Action of related U.S. Appl. No. 18/199,454 dated Jan. 16, 2026.
Office Action of related U.S. Appl. No. 18/199,472 dated Jan. 13, 2026.
Office Action of related Korean Patent Application No. 10-2023-0051655 dated Febraury 10, 2026.
Office Action of related Chinese Patent Application No. 202310440351.3 dated Jan. 13, 2026.
Office Action of related U.S. Appl. No. 18/199,465 dated Jan. 26, 2026.
Office Action of related U.S. Appl. No. 18/199,454 dated May 7, 2026.
Office Action of related Chinese Patent Application No. 202310440351.3 dated Jul. 17, 2026.

* cited by examiner

FIG. 4
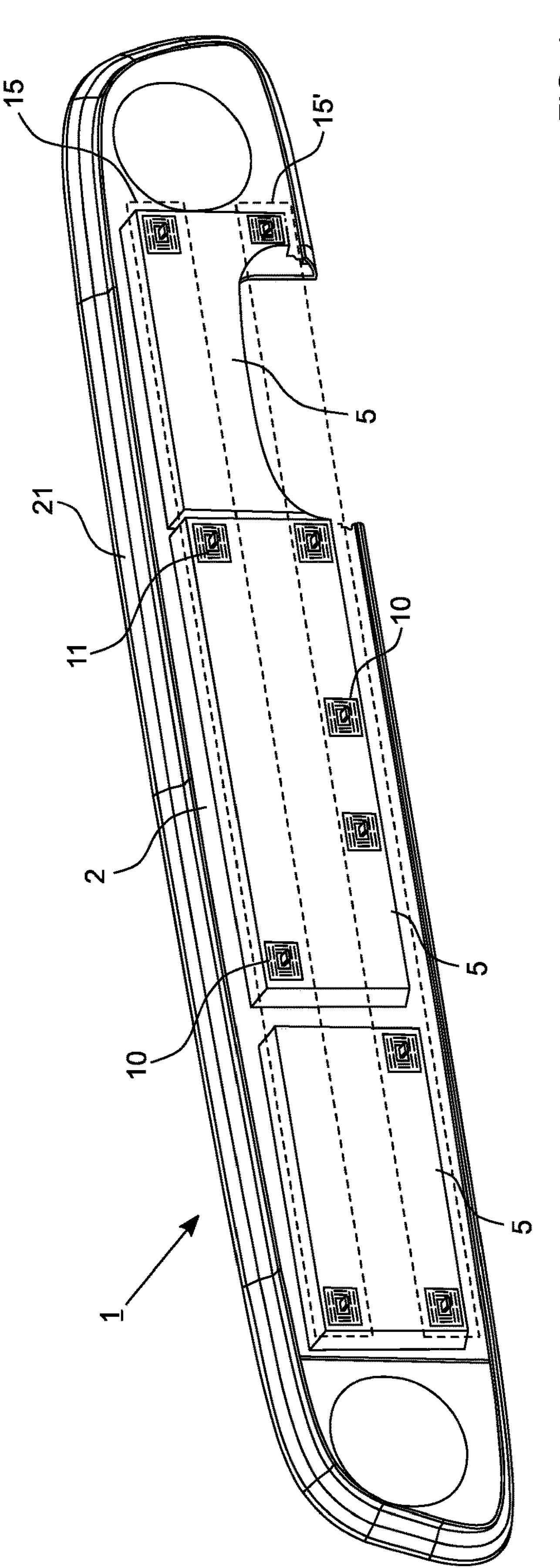
15
15'
5
21
11
10
2
5
10
5
1

FIG. 5
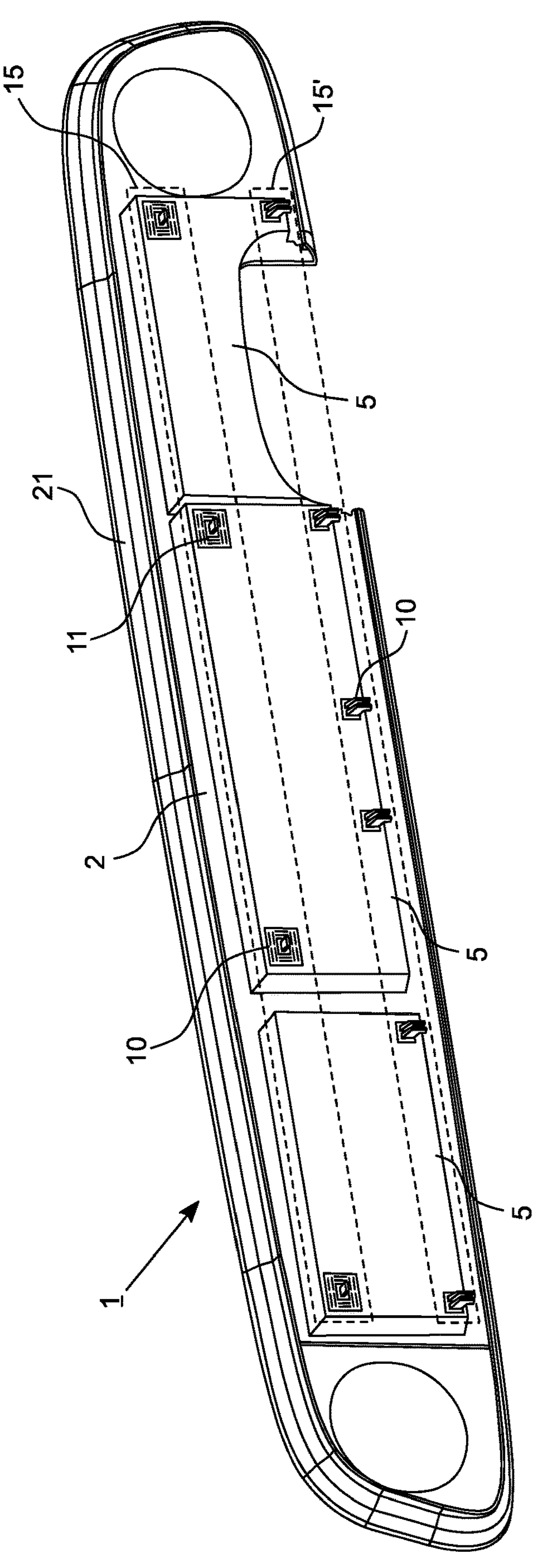
15
15'
5
21
11
10
10
2
5
5
1

SUBASSEMBLY FOR A MEANS OF TRANSPORT, AND MEANS OF TRANSPORT

CROSS REFERENCE TO RELATED APPLICATION

This U.S. patent application claims the benefit of German patent application No. 10 2022 205 053.3, filed May 20, 2022, which is hereby incorporated by reference.

TECHNICAL FIELD

The present disclosure relates to a subassembly for a means of transport and to a means of transport with such a subassembly.

BACKGROUND

In modern motor vehicles, display devices are increasingly used to present relevant driving information, to operate equipment of the motor vehicle, or to play media. These display devices are typically arranged in the dashboard.

Display devices in the vehicle interior are located directly in front of the vehicle occupants and are, therefore, always exposed to the risk of a head impact. Therefore, a new product has to pass a certified head impact test in order to be permitted for use.

Display devices and other components with a glass front must, on the one hand, be configured as stable and robust in order to support the glass as well as possible so that it does not shatter in the event of a head impact. On the other hand, the carrier element or the housing must be capable of deviating backward in the event of a head impact and thus absorbing some of the energy of the impact so that the head is not subject to an excessively high deceleration when it impacts. In order to meet both requirements, current solutions are generally based on a very robust and stiff support for the glass, in combination with a very ductile element behind the display device or the dashboard, which absorbs the energy of the head impact.

In this connection, DE 10 2008 052 007 A1 describes a cockpit cross-beam for a motor vehicle with a base beam and at least one fastening bracket for attaching the cockpit cross-beam to the vehicle body. The base beam is configured as a light metal cast structure. An adjusting element, which is designed to absorb at least partially the force exerted on the cockpit cross-beam in the event of the motor vehicle crashing, is provided between the base beam and the fastening bracket.

The housing and the carrier elements, which should be robust and at the same time as light as possible, are often manufactured from magnesium alloys. However, such magnesium alloys are typically brittle, for which reason additional steel or aluminum ductile mounts are used in order to ensure the required energy absorption for decelerating the head when it impacts.

The object of the disclosure is to provide simplified solutions which ensure energy absorption in the event of a head impact on a subassembly of a means of transport.

SUMMARY

According to a first aspect of the disclosure, a subassembly for a means of transport has a carrier element with fastening elements for fastening the subassembly in the means of transport, wherein the fastening elements are an integral part of the carrier element and at least individual fastening elements are configured as energy-absorbing.

In the solution according to the disclosure, at least some fastening elements of the carrier element are formed such that they are capable of being deformed in the event of a head impact and thus absorb some of the impact energy. In this way, they prevent excessive deceleration of the head when it impacts. Because the fastening elements are an integral part of the carrier element, i.e. because the carrier element is configured in a single piece, cost-effective production of the carrier element is enabled. In particular, there is no need to mount individual fastening elements. This results in addition in a more robust tolerance chain for the subassembly. Simultaneously, no dissimilar materials are combined, this reducing the potentially disruptive effects of changes in temperature and the risks of corrosion.

According to an aspect of the disclosure, the energy absorption by the fastening elements is based on the geometrical shape of the fastening elements. According to the disclosure, the elasticity of the material is replaced or supplemented by a geometrical elasticity which is produced by the shape of the fastening elements. The energy absorbed depends, on the one hand, on the material properties of the fastening elements but, on the other hand, also on the geometry of the fastening elements, for example the length of the relevant constituent parts of the fastening elements or the number of spring elements. In this way, the fastening elements enable controlled failure in the event of the impact of a head but are nevertheless robust enough to protect the subassembly in the case of improper handling.

According to one aspect of the disclosure, the carrier element is manufactured from a magnesium-based material. Magnesium is particularly light but nevertheless stable enough to be able to support in particular also a large-area display device. However, other materials for the carrier element can of course also be used.

According to one aspect of the disclosure, the fastening elements have a structure consisting of interconnected webs. Long spring-like arms and shoulders, which permit a high load before the structure fails, can be effected by a skillful arrangement of the webs.

According to one aspect of the disclosure, the structure has a central fastening area. This central fastening area has a sufficiently large area for fastening in the means of transport may be ensured. The fastening area may carry, for example, a mounting angle which is screwed or connected by means of snap-fitting to an associated fastening point of the means of transport.

According to one aspect of the disclosure, the structure is configured to be loaded beyond the yield point in the event of a head impact. This ensures that the fastening elements after the head impact are no longer functional for their function and therefore cannot be used a second time. However, this is a state which is entirely of minor importance in terms of an accident or head impact that has happened. Rather, it is indeed relevant in terms of safety that the deformation of the fastening elements is clearly identifiable and the latter may clearly no longer be used. It is mandatory that fastening elements once deformed must be replaced because the correct functioning would no longer be reliably guaranteed in the event of a second head impact.

According to one aspect of the disclosure, the fastening elements are arranged in two rows and only the fastening elements of one of the rows are configured as energy-absorbing. In this embodiment, in the event of a head impact, only the fastening elements of one of the rows are deformed, preferably an upper row. This causes the whole subassembly to be rotated about an axis which is defined by the fastening elements of the other row. This shifts an impact point of the head away from the edge of the subassembly further into the inner area of the subassembly, which may be advantageous if the subassembly has a display device. In this case, the impact point may be moved away from a particularly vulnerable glass edge of the display device.

According to one aspect of the disclosure, the carrier element has at least one area for holding a display device. In this way, in addition to cover elements such as, for example, covers of ventilation nozzles or orifices, the carrier element may at the same time also carry the display devices provided in the means of transport. This is particularly advantageous if it is intended for a seamless design to be implemented in which adjacent components adjoin one another with almost no gap and form a common surface.

According to one aspect of the disclosure, the subassembly is configured as a dashboard. A subassembly according to the disclosure is for example used in a means of transport, in particular in the form of a dashboard. The means of transport may be, for example, a motor vehicle but alternatively also an aircraft, a rail vehicle, or a watercraft. The solution according to the disclosure is suitable for each component in the area of a possible head impact or wherever energy absorption by deformation is required, whilst stability and robustness are necessary in the same subassembly. Examples are displays or operating units for multimedia systems or air-conditioning units with surfaces made from glass or other brittle materials. Entertainment systems for rear seats or rows of seats are also subject to the risk of a head impact.

Further features of the present disclosure will be evident from the following description and the appended claims in conjunction with the figures.

BRIEF DESCRIPTION OF THE DRAWINGS

FIG. 4 schematically shows a rear side of a first embodiment of a dashboard as an example of a subassembly according to the disclosure;

FIG. 5 schematically shows a rear side of a second embodiment of a dashboard as an example of a subassembly according to the disclosure;

DETAILED DESCRIPTION

For a better understanding of the principles of the present disclosure, embodiments of the disclosure will be explained in more detail below with the aid of the figures. The same reference signs are used in the figures for identical or functionally identical elements and are not necessarily described again for each figure. It is understood that the invention is not limited to the illustrated embodiments and that the described features may also be combined or modified without departing from the scope of protection of the disclosure as defined in the appended claims.

Figure 1:
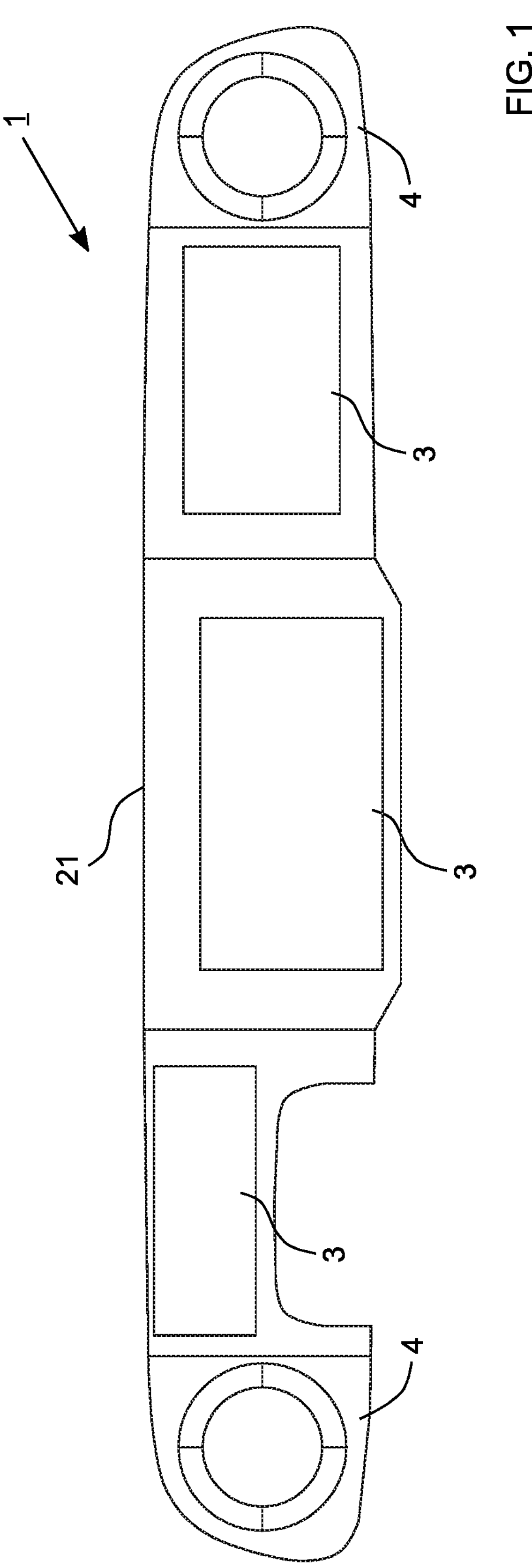
FIG. 1 schematically shows a dashboard for a motor vehicle.

FIG. 1 schematically shows a dashboard 21 for a motor vehicle as an example of a subassembly 1. The dashboard 21 is designed such that it extends over the whole width of the motor vehicle. It has a plurality of display devices 3 and cover elements 4 adjoining them. The cover elements 4 serve in this example at the same time as covers for ventilation nozzles. The display devices 3 and the cover elements 4 are arranged such that they adjoin one another with almost no gaps and form a common surface. Some of the display devices 3 are located directly in front of the vehicle occupants and are, therefore, always exposed to the risk of a head impact. The display devices 3 and possibly also other components with a glass front must, on the one hand, be configured as stable and robust in order to support the glass as well as possible so that it does not shatter in the event of a head impact. On the other hand, the dashboard 21 or a carrier element of the dashboard 21 must be capable of deviating backward in the event of a head impact and thus absorbing some of the energy of the impact so that the head is not subject to an excessively high deceleration when it impacts.

Figure 2:
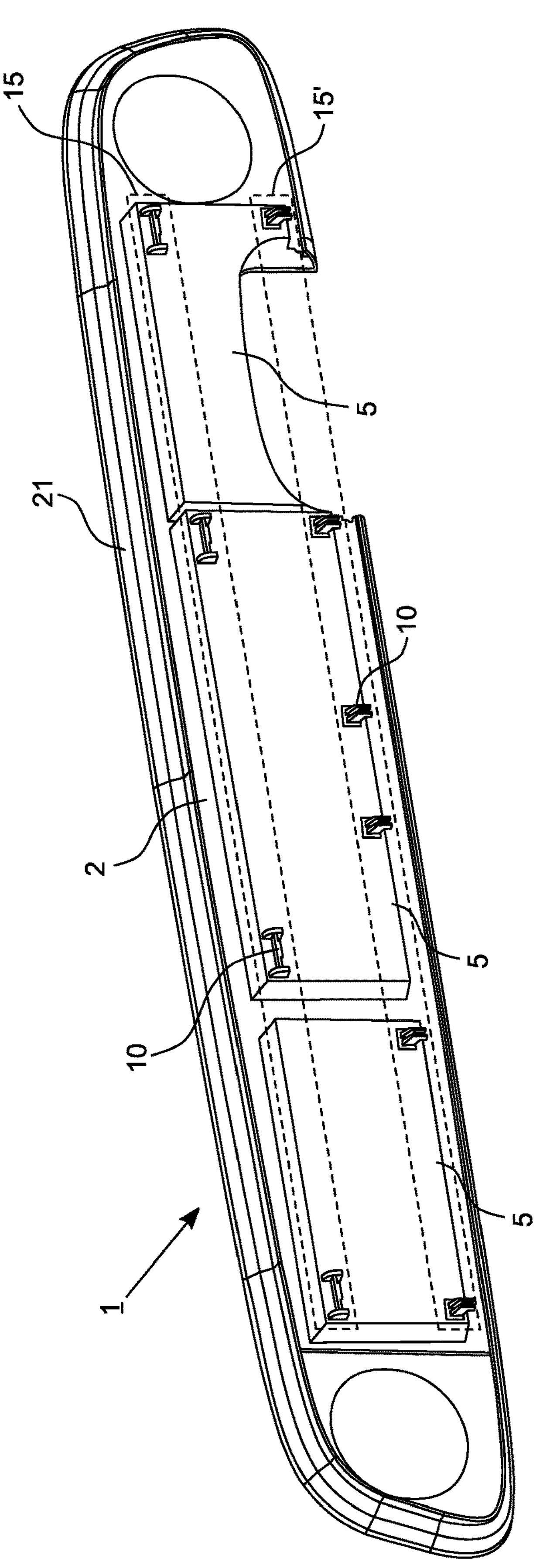
FIG. 2 schematically shows a rear side of the dashboard from FIG. 1.

FIG. 2 schematically shows a rear side of the dashboard 21 from FIG. 1. The dashboard 21 has a carrier element 2 with holding areas 5 for the display devices and with numerous fastening elements 10 for fastening the dashboard 21 in the means of transport. In this example, the fastening elements 10 are arranged in two rows 15, 15', i.e. some of the fastening elements 10 form an upper row 15 and some of the fastening elements 10 form a lower row 15'. The carrier element 2 is thus robust and at the same time as light as possible and is preferably manufactured from a magnesium alloy. However, such magnesium alloys are typically brittle. Therefore, steel or aluminum ductile mounts (not illustrated) are used in addition to the fastening elements 10 in order to ensure the required energy absorption for decelerating the head when it impacts.

Figure 3:
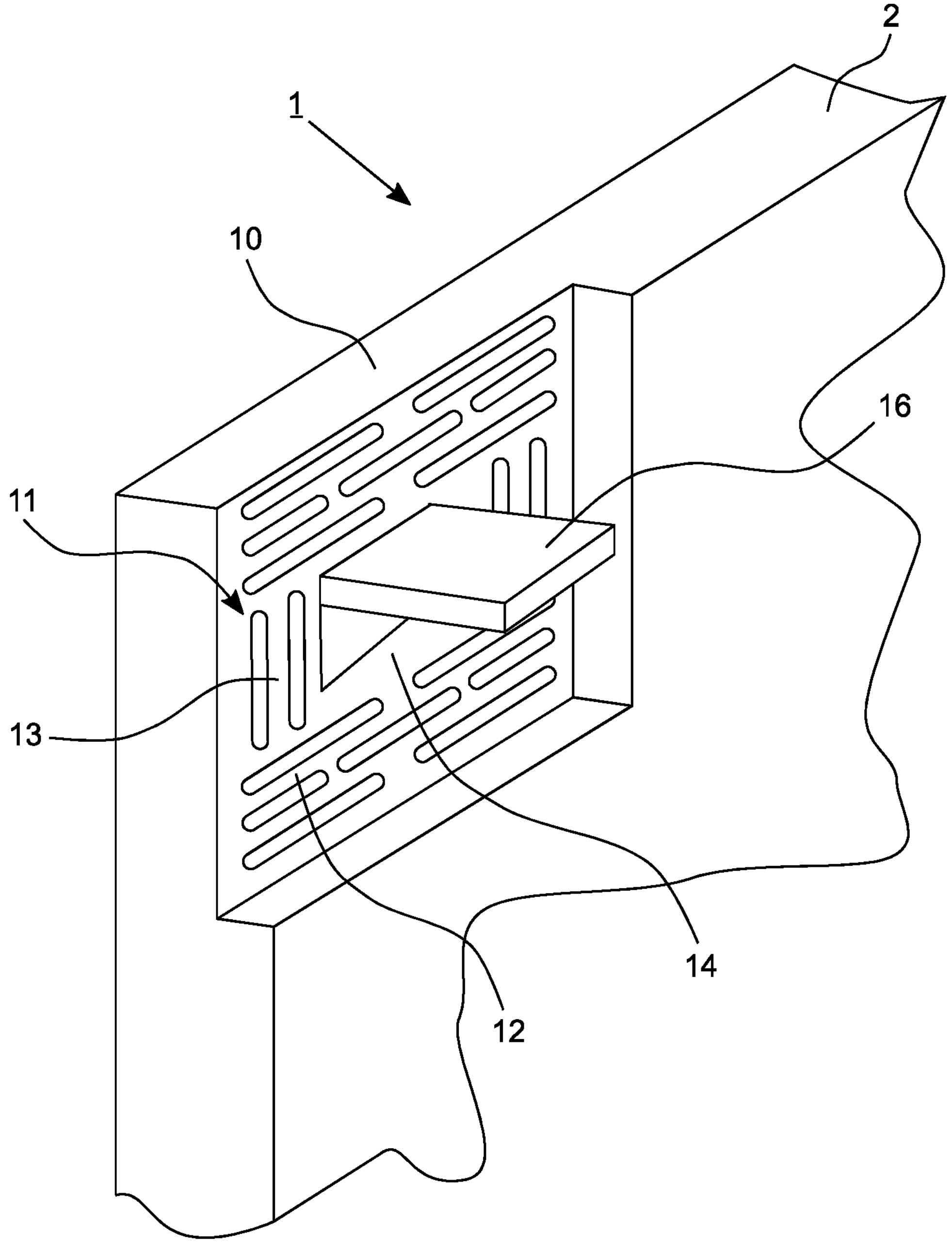
FIG. 3 schematically shows a detailed view of a subassembly according to the disclosure.

FIG. 3 schematically shows a detailed view of a subassembly 1 according to the disclosure. Visible is the carrier element 2 of the subassembly 1 with an individual fastening element 10 which is an integral part of the carrier element 2. The carrier element 2 is preferably manufactured from a magnesium-based material. However, other materials may of course also be used for the carrier element 2. The fastening element 10 is configured as energy-absorbing, wherein the energy absorption is based on the geometrical shape of the fastening element 10. In other words, the elasticity of the material is replaced or supplemented by a geometrical elasticity which is produced by the shape of the fastening element 10. In this way, the fastening element 10 enables controlled failure in the event of the impact of a head but is nevertheless robust enough to protect the subassembly 1 in the case of improper handling. In order to implement the energy-absorbing configuration, the fastening element 10 has a structure 11 consisting of interconnected webs 12, 13. Long spring-like arms and shoulders, which permit a high load before the structure 11 fails, may be effected by a skillful arrangement of the webs 12, 13. A central fastening area 14, by means of which a sufficiently large area is ensured for fastening the component 1, for example in a means of transport, is located in the center of the structure 11. In the example illustrated, the fastening area 14 carries a mounting angle 16 which may be screwed or The structure 11 of the fastening element 10 may be configured to be loaded beyond the yield point in the event of a head impact. This ensures that the fastening element 10 after the head impact is no longer functional for its function and therefore cannot be used a second time.

FIG. 4 schematically shows a rear side of a first embodiment of a dashboard 21 as an example of a subassembly 1 according to the disclosure. The dashboard 21 has a carrier element 2 with holding areas 5 for display devices and with numerous fastening elements 10 for fastening the dashboard 21 in the means of transport. The fastening elements 10 are in turn arranged in two rows 15, 15', i.e. some of the fastening elements 10 form an upper row 15 and some of the fastening elements 10 form a lower row 15'. The carrier element 2 may, for example, be manufactured from a magnesium alloy. In this embodiment, all the fastening elements 10 are configured as energy-absorbing and therefore have the structure 11, illustrated in FIG. 3, consisting of webs. The use of additional steel or aluminum ductile mounts is therefore not required in order to ensure the required energy absorption for decelerating a head when it impacts.

Figure 6:
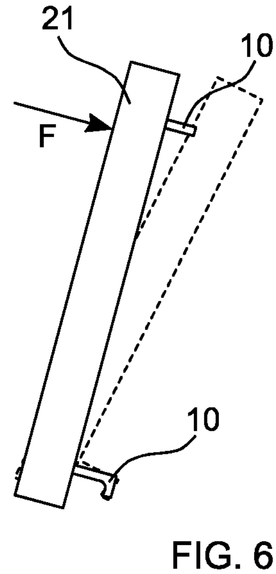
FIG. 6 illustrates a rotation of the dashboard from FIG. 5 in response to an acting force.

FIG. 5 schematically shows a rear side of a second embodiment of a dashboard 21 as an example of a subassembly 1 according to the disclosure. The dashboard 21 has a carrier element 2 with holding areas 5 for display devices and with numerous fastening elements 10 for fastening the dashboard 21 in the means of transport. The carrier element 2 may, for example, be manufactured from a magnesium alloy. The fastening elements 10 are in turn arranged in two rows 15, 15'. In this embodiment, however, only the fastening elements 10 of the upper row 15 are configured as energy-absorbing and therefore have the structure 11, illustrated in FIG. 3, consisting of webs. The fastening elements 10 of the lower row 15' are, in contrast, largely rigid. This results, in the event of a head impact on the dashboard 21, in rotation of the dashboard 21 about an axis which is defined by the fastening elements 10 of the lower row 15'. Such rotation of the dashboard 21 in response to an acting force F is illustrated in FIG. 6. Also in this embodiment, sufficient energy absorption may be ensured by the fastening elements 10 of the upper row 15. At the same time, the rotation of the dashboard 21 results in a head impact point being shifted further into the inner area of the dashboard 21. This may be used to move the head impact point away from the particularly vulnerable edge areas of the display devices. Of course, alternatively the fastening elements 10 of the upper row 15 may also be configured as rigid and the fastening elements 10 of the lower row 15' as energy-absorbing. In this case, this results in rotation of the dashboard 21 about an axis which is defined by the fastening elements 10 of the upper row 15. It is also possible to provide rotation about a vertical axis instead of rotation about a horizontal axis.

Figure 7:
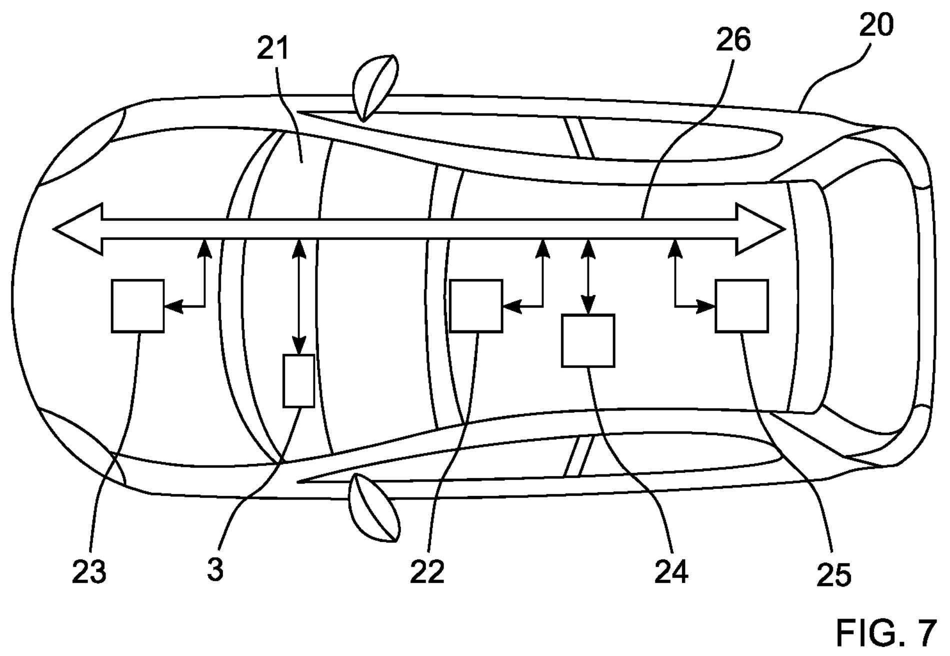
FIG. 7 schematically shows a means of transport which uses a subassembly according to the disclosure.

FIG. 7 schematically shows a means of transport 20 which uses a subassembly according to the disclosure. In this example, the means of transport 20 is a motor vehicle and the subassembly is the dashboard 21. The motor vehicle has a display device 3 which is arranged in the dashboard 21. Data on the vehicle surroundings may be acquired by a sensor system 22. The sensor system 22 may in particular comprise surroundings recognition sensors, for example ultrasonic sensors, laser scanners, radar sensors, lidar sensors, or cameras. The information acquired by the sensor system 22 may be used to generate content to be displayed for the display device 3. Further constituent parts of the motor vehicle in this example are a navigation system 23, by which positional information may be provided, and also a data transmission unit 24. A connection to a back-end, for example for receiving updated software for components of the motor vehicle, may, for example, be established by means of the data transmission unit 24. A memory 25 is present for storing data. Data is exchanged between the various components of the motor vehicle via a network 26.

The invention claimed is:

1. A subassembly for a transport comprising:

a carrier element with fastening elements for fastening the subassembly in the transport, wherein the fastening elements are an integral part of the carrier element and at least individual fastening elements are configured as energy-absorbing, wherein the fastening elements have a planar structure consisting of interconnected webs comprising spring-like arms and shoulders.

2. The subassembly as claimed in claim 1, wherein the energy absorption by the fastening elements is based on the geometrical shape of the fastening elements.

3. The subassembly as claimed in claim 1, wherein the carrier element is manufactured from a magnesium-based material.

4. The subassembly as claimed in claim 1, wherein the structure has a central fastening area.

5. The subassembly as claimed in claim 4, wherein the central fastening area comprises a mounting angle that extends perpendicularly with respect to the planar structure of the fastening elements.

6. The subassembly as claimed in claim 1, wherein the structure is configured to be loaded beyond the yield point in the event of a head impact.

7. The subassembly as claimed in claim 1, wherein the fastening elements are arranged in two rows and only the fastening elements of one of the rows are configured as energy-absorbing such that the fasteners in the one of the rows are less rigid than the fasteners in the other row.

8. The subassembly as claimed in claim 1, wherein the carrier element has at least one area for holding a display device.

9. The subassembly as claimed in claim 1, wherein the subassembly is configured as a dashboard.

10. The subassembly as claimed in claim 1, wherein the interconnected webs are separated by slots formed in the carrier element.

11. A transport, comprising: a subassembly comprising: a carrier element with fastening elements for fastening the subassembly in the transport, wherein the fastening elements are an integral part of the carrier element and at least individual fastening elements are configured as energy absorbing, wherein the fastening elements have a planar structure consisting of interconnected webs comprising spring-like arms and shoulders.

* * * * *